(12) United States Patent
Li

(10) Patent No.: US 6,526,196 B1
(45) Date of Patent: Feb. 25, 2003

(54) OPTICAL SWITCH USING ROTATABLE REFLECTOR

(75) Inventor: David Ya Li, Sunnyvale, CA (US)

(73) Assignee: Oxconn Optical Technology Inc., George Town (KY)

( * ) Notice: Subject to any disclaimer, the term of this patent is extended or adjusted under 35 U.S.C. 154(b) by 61 days.

(21) Appl. No.: 09/802,414

(22) Filed: Mar. 9, 2001

(51) Int. Cl.$^7$ ................................. G02B 6/42
(52) U.S. Cl. ..................... 385/18; 385/17; 385/24
(58) Field of Search .............. 385/16–24, 17, 385/18

(56) References Cited

U.S. PATENT DOCUMENTS 5,841,917 A * 11/1998 Jungerman et al. ........... 385/17
6,091,867 A *  7/2000 Young et al. ................. 385/17

* cited by examiner

*Primary Examiner*—Phan T. H. Palmer
(74) *Attorney, Agent, or Firm*—Wei Te Chung

(57) ABSTRACT

An optical switch includes a light transmitting/receiving sub-assembly and a reflecting device rotatable relative to and confronted with the light transmitting/receiving array sub-assembly. The reflecting device includes two reflecting strips perpendicular to each other. One of the reflecting strips is consisted of two symmetrically arranged 90-degree angled mirrors, and the other includes four symmetrically arranged 90-degree angled mirrors. The sub-assembly includes two linear arrays of collimators which are positioned on a circular disk and are perpendicular to each other corresponding to the two reflecting strips. The collimators of each collimator array are equally spaced from each other. By rotating the light transmitting/receiving sub-assembly with respect to the reflecting device, the light from the light transmitting/receiving sub-assembly is switched between the reflecting strips of the reflecting device.

31 Claims, 8 Drawing Sheets

OPTICAL SWITCH USING ROTATABLE REFLECTOR

BACKGROUND OF THE INVENTION

1. Field of the Invention

The present invention involves an optical switch, and particularly relates to a mechanical optical switch with rotatable reflecting means.

2. Description of Related Art

Optical switches are divided into two types. One is mechanical type and the other is non-mechanical type. In principle, the mechanical type optical switches have a number of advantages over other forms of optical switches in such applications where switching speed is not important. Mechanical type optical switches offer low insertion losses, a high degree of immunity against backscattering of light from the switch back down the input fiber, low cross-talk, and insensitivity to wavelength of light.

An elementary mechanical switch is operated by moving an input fiber relative to a plurality of output fibers. The simplest scheme is a "butt-coupling" scheme in which the input fiber is moved to be selectively aligned with one of a plurality of output fibers by a motor. This kind of optical switch is limited in switching channels and has a bulky configuration and very slow switching speed.

Another kind of mechanical switch 40, as disclosed in U.S. Pat. No. 5,841,917 and shown in FIG. 7, includes an input port plate 41, an output port plate 42, and an array of reflectors 44 movably mounted on a base 43 and electrically connected to a control element 45. Each reflector 44 is connected to a driving post 48 which is mounted to a substrate 46 and moved by the control element 45. An input light beam 47 coming from a path 41a of the input port plate 41 is reflected by one of the reflectors 44 to leave the switch 40 from a corresponding path 42a of the output port plate 42. The reflectors 44 are selectively moved, via the corresponding driving posts 48, to protrude upwards out of or retract downwards into the base 43 thereby selectively reflecting the input light beam 47. Although the switching speed is higher than other mechanical optic switches discussed above, the switch 40 is still bulky and performs a complicated operation.

FIG. 8 shows another kind of mechanical switch 50 disclosed in U.S. Pat. No. 6,091,867. The switch 50 employs a plurality of reflecting elements 52, 54 having variable light transmission to achieve the switching function thereof. Each reflecting element 52 (54) may reflect an incident beam from an input port 51 to an output port 53 (55) or acts as a transmitter to pass the incident beam through. Whether the reflecting elements 52, 54 function as mirrors or transmitters depends on the application of control stimulus thereonto, such as medium transmissivity-modifying voltages. Such a design increases difficulty in manufacturing requirements and costs involved at the same time. This adversely offsets its advantages of a possible higher switching speed.

BRIEF SUMMARY OF THE INVENTION

An object of the present invention is to solve the problems discussed above for providing an optical switch having a simple structure, small size, low costs and easy to operate.

In accordance with one aspect of the present invention, an optical switch comprises a light transmitting/receiving subassembly and a reflecting means facing each other. The light transmitting/receiving sub-assembly and the reflecting means are rotatable relative to each other between first and second positions. The relative rotation therebetween is realized by a motor rotating either one of the light transmitting/ receiving subassembly and the reflecting means with respect to the other. The invention was filed with the Disclosure Document No. 482,438 dated Nov. 9, 2000 in an earlier time.

In an embodiment, the reflecting means comprises two reflecting strips perpendicular to each other. The reflecting strips may be integratively formed or coated on a circular disk. The two reflecting strips may also be separative and be connected with each other by the disk.

One of the reflecting strips consists two pairs of reflecting surfaces which are arranged to be 90-degree angled to each other, each pair forming a 90-degree angled mirror. The two 90-degree angled mirrors are arranged to be symmetrical about a center of the disk. Another reflecting strip comprises four 90-degree angled mirrors arranged to be symmetrical with respect to the center of the disk as well. A free zone is formed around the center between the two reflecting strips so as not to cause interferences therebetween.

The light transmitting/receiving sub-assembly comprises first and second linear arrays of collimators corresponding to the reflecting strips and thus are perpendicular to each other. Each array comprises equally-spaced collimators.

In a first position, light from the odd-numbered collimators of the first collimator array is reflected by the corresponding mirrors of the corresponding first reflecting strip to the corresponding even-numbered collimators in a non-sequential fashion. At the same time, light transmitting from the odd-numbered collimators of the second collimator array enters the corresponding even-numbered collimators after being reflected by the corresponding four 90-degree angled mirrors of the corresponding second reflecting strip in a sequential fashion.

In a second position, where the reflecting means is rotated 90 degrees relative to the light transmitting/receiving subassembly, whereby the first collimator array is opposite to the second reflecting strip while the second collimator array is opposite to the first reflecting strip. Light from the odd-numbered collimators of the first collimator array will be reflected by the four 90-degree angled mirrors of the second reflecting strip, and thus switched to the corresponding even-numbered collimators in exactly the same way as that of the first collimator array and the first reflecting strip in the first position. Similarly, the light reflecting paths between the second collimator array and the first reflecting strip replicate those between the first collimator array and the first reflecting strip originally occurred in the first position. Due to the difference between the output sequences of the light beams, a switching operation is achieved.

DETAILED DESCRIPTION OF THE INVENTION

Figure 1:
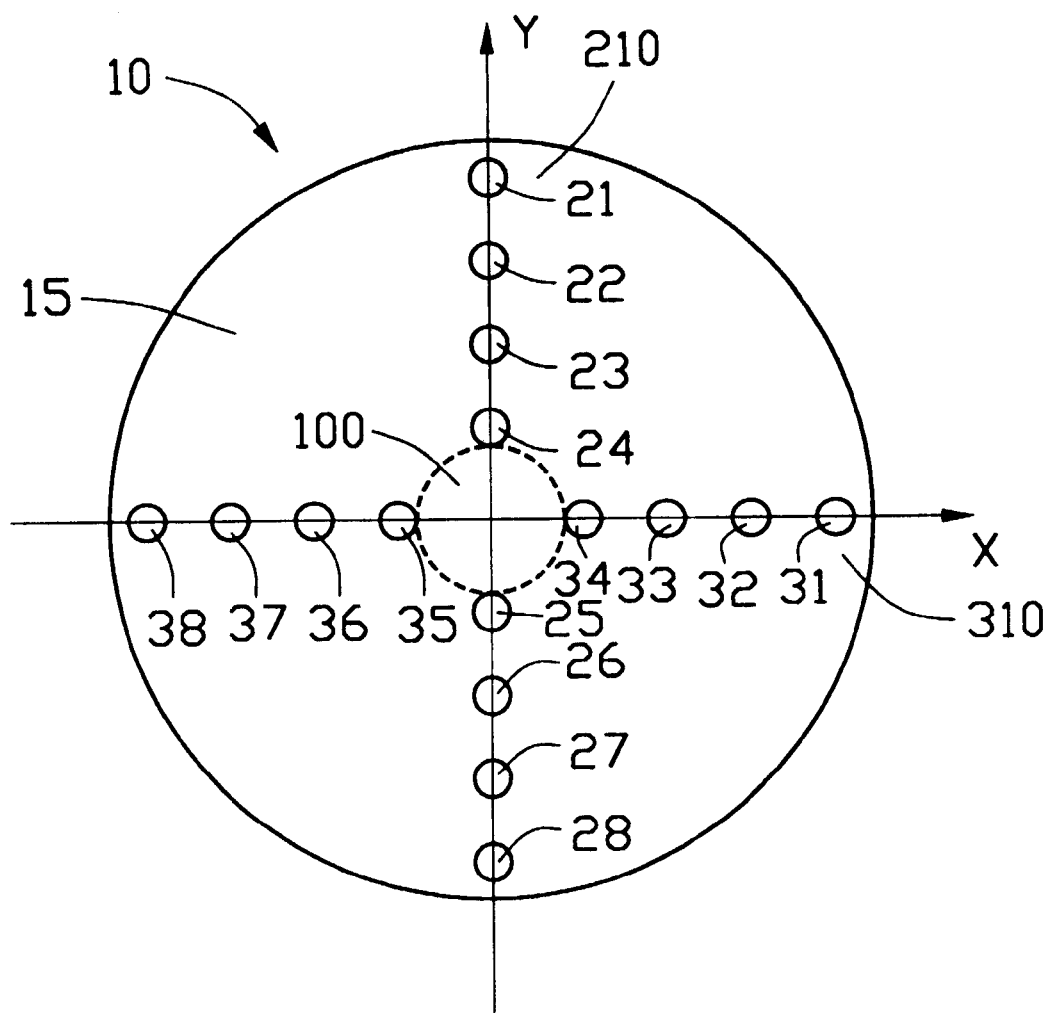
FIG. 1 is an elevational view of a light transmitting/ receiving sub-assembly of an optical switch in accordance with the present invention.
Figure 2:
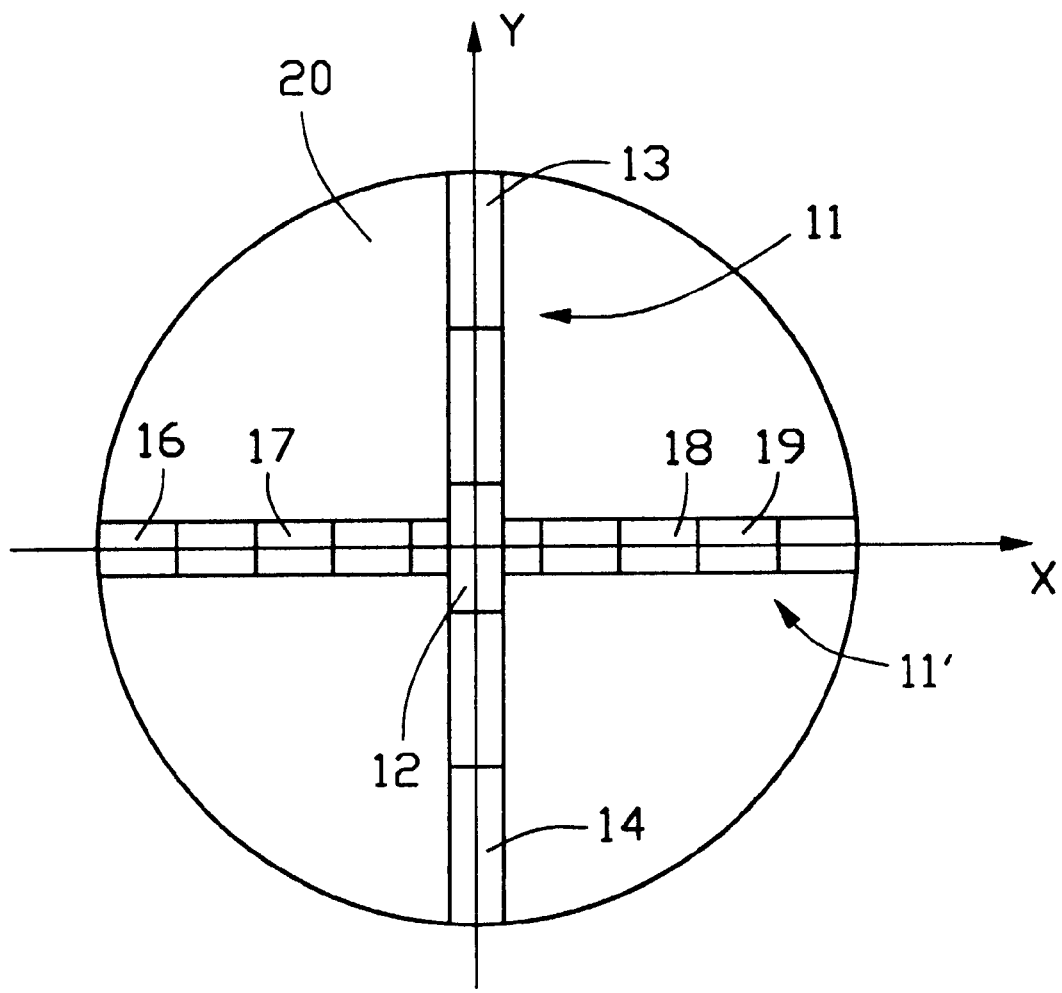
FIG. 2 is an elevational view of a reflecting means of the optical switch in accordance with the present invention.
Figure 3:
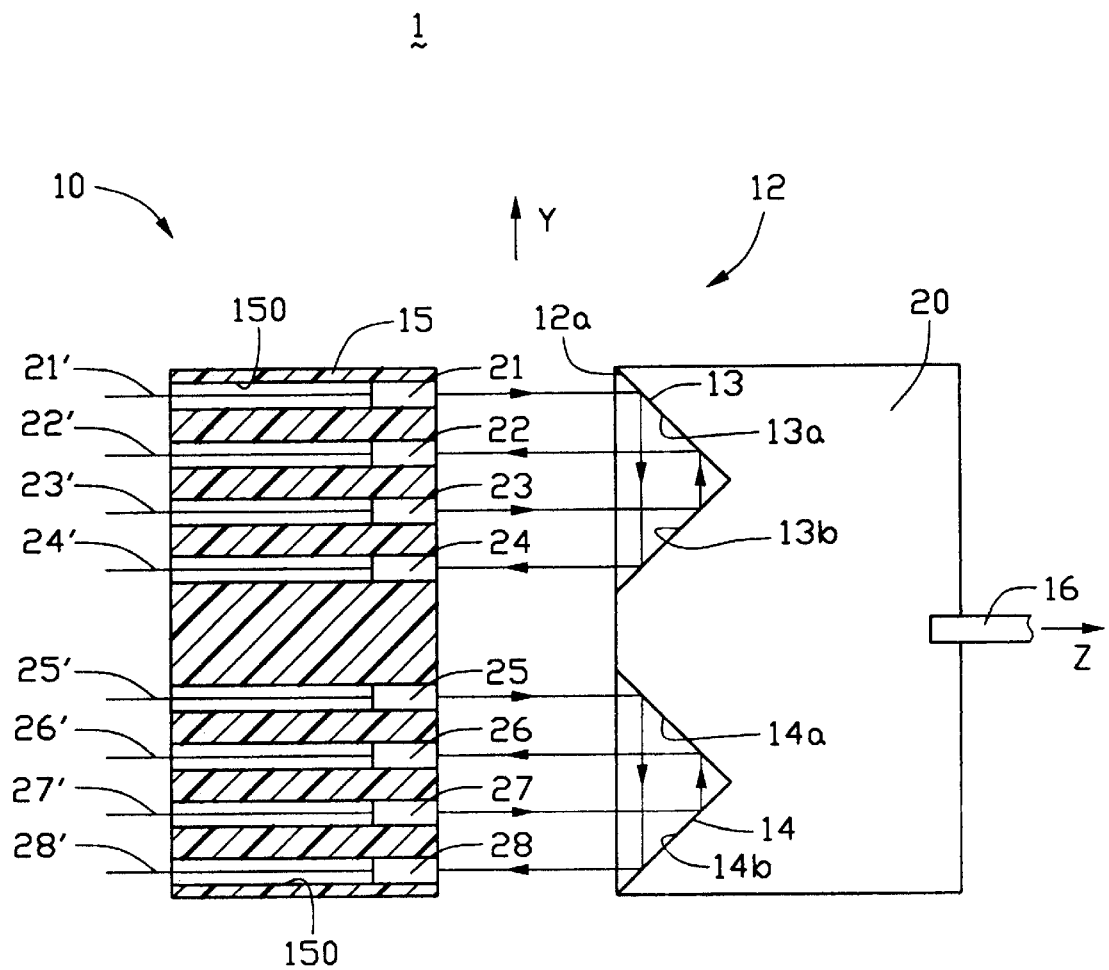
FIG. 3 is a cross sectional view of the optical switch in accordance with the present invention in a first position.

As shown in FIGS. 1, 2 and 3, an optical switch 1 in accordance with the present invention comprises a light transmitting/receiving sub-assembly 10 and reflecting means 12 which are arranged to confront each other as shown in FIG. 3. The light transmitting/receiving sub-assembly 10 and the reflecting means 12 are rotatable relative to each other. The relative rotation therebetween can be realized by a driving post 16 attached to either one of the reflecting means 12 and the light transmitting/receiving sub-assembly 10. In the embodiment illustrated, the driving post 16 is attached to the reflecting means 12 and is operated by a motor or the likes (not shown) to rotate the reflecting means 12 with respect to the light transmitting/receiving subassembly 10.

The reflecting means 12 may include two reflecting strips 11, 11' perpendicular to each other. The two reflecting strips 11, 11' may be integratively formed or coated on a disk 20. The two reflecting strips 11, 11' may also be separative and be connected with each other by the central driving post 16. Preferably, the disk 20 is circular with the strips 11, 11' extending along diameters of the circle. The driving post 16 is preferably co-axial with the circular disk 20.

Figure 4:
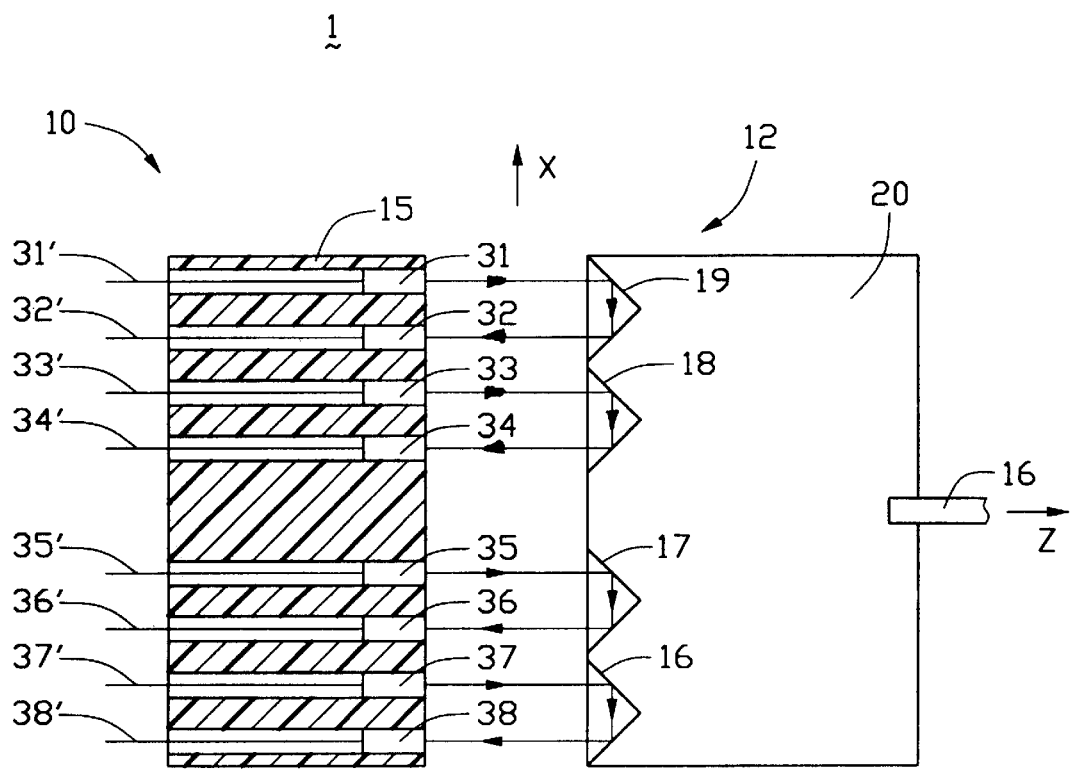
FIG. 4 is similar to FIG. 3 with the reflecting means rotated to a second position.

The reflecting strip 11 is consisted of two pairs of reflecting surfaces 13a, 13b, and 14a, 14b (FIG. 3). The reflecting surfaces of each pair 13a, 13b or 14a, 14b are arranged to form a 90-degree included angle therebetween. Thus, each pair forms a 90-degree angled mirror 13, 14. The two 90-degree angled mirrors 13, 14 are arranged to be symmetrical with respect to a center of the circular disk 20 and thus symmetrical with respect to the driving post 16. The reflecting strip 11' comprises four 90-degree angled mirrors 16, 17, 18, 19 which are arranged to be symmetrical with respect to the center of the disk 20 and the driving post 16 as shown in FIG. 4. A free zone 120 is formed on the disk 20 around the center thereof between the mirrors (13, 14) and (15–19) of the reflecting strips 11, 11'. The free zone 120 prevents interference between the mirrors 13, 14 of the strip 11 and the mirrors 15–19 of the strip 11'.

The light transmitting/receiving sub-assembly 10 is composed of two linear arrays 210, 310 of collimator 21–28, 31–38 which are mounted to a substrate 15 and substantially perpendicular to each other. The collimators of each linear array 210, 310 are equally spaced from each other except a central area 100 corresponding to the free zone 120 of the reflecting means 12.

The light transmitting/receiving sub-assembly 10 further includes a plurality of optical fibers respectively connected to the corresponding collimators 21–28 and 31–38. The collimator arrays 210, 310 are embedded within the substrate 15 as shown in the drawings. Alternatively, the collimators 21–28 and 31–38 may be positioned on the substrate 15. A plurality of holes 150 are defined in the substrate 15 for facilitating the connections between the optical fibers 21'–28' and 31'–38' and the corresponding collimators 21–28 and 31–38.

Further referring to FIGS. 3 and 4, the operation of the optical switch 1 will be described. In a first position (FIG. 3), the first collimator array 210 are arranged in a first direction and extend along axis Y so as to confront the first reflecting strip 11 that has two 90-degree angled mirrors 13, 14 while the collimator array 310 extends in a second direction along axis X, facing the second reflecting strip 11' that has four 90-degree angled mirrors 16, 17, 18 and 19.

As to the case of the collimator array 210 and the reflecting strip 11, light from the odd-numbered collimators 21, 23, 25 and 27 via the corresponding odd-numbered fibers 21', 23', 25' and 27' is reflected by the corresponding mirrors 13, 14 of the first reflecting strip 11 to the corresponding even-numbered collimators 24, 22, 28 and 26. Then the reflected light is re-directed to the corresponding even-numbered fibers 24', 22', 28' and 26' thereby exiting the switch 1.

With the case of the second collimator array 310 and the second reflecting strip 11', light transmitting from the odd-numbered collimators 31, 33, 35 and 37 enters the corresponding even-numbered collimators 32, 34, 36 and 38 after being reflected by the corresponding four 90-degree angled mirrors 16, 17, 18 and 19.

In a second position, where the reflecting means 12 is rotated 90 degrees relative to the light transmitting/receiving sub-assembly 10, whereby the first collimator array 210 is opposite to the second reflecting strip 11' while the second collimator array 310 is opposite to the first reflecting strip 11, light from the odd-numbered collimators 21, 23, 25 and 26 is reflected by the 90-degree angled mirrors 16, 17, 18 and 19 of the second reflecting strip 11', and thus switched to the corresponding even-numbered collimators 22, 24, 26 and 28 in exactly the same way as that of the collimator array 310 and the reflecting strip 11' in the first position. Similarly, the light reflecting paths between the second collimator array 310 and the first reflecting strip 11 replicate those between the first collimator array 210 and the first reflecting strip 11 originally occurred in the first position.

If the reflecting means 12 is further rotated 90 degrees, then the reflecting means 12 reaches a position that is an image of the first position with respect to the center of the reflecting means 12. the light passing through the fiber optic 21'–28' and 31'–38' is reflected in the same way as the first position for both the collimator arrays 210, 310 and the reflecting strips 11, 11' are arranged symmetrical about the center of the reflecting means 12.

Figure 5:
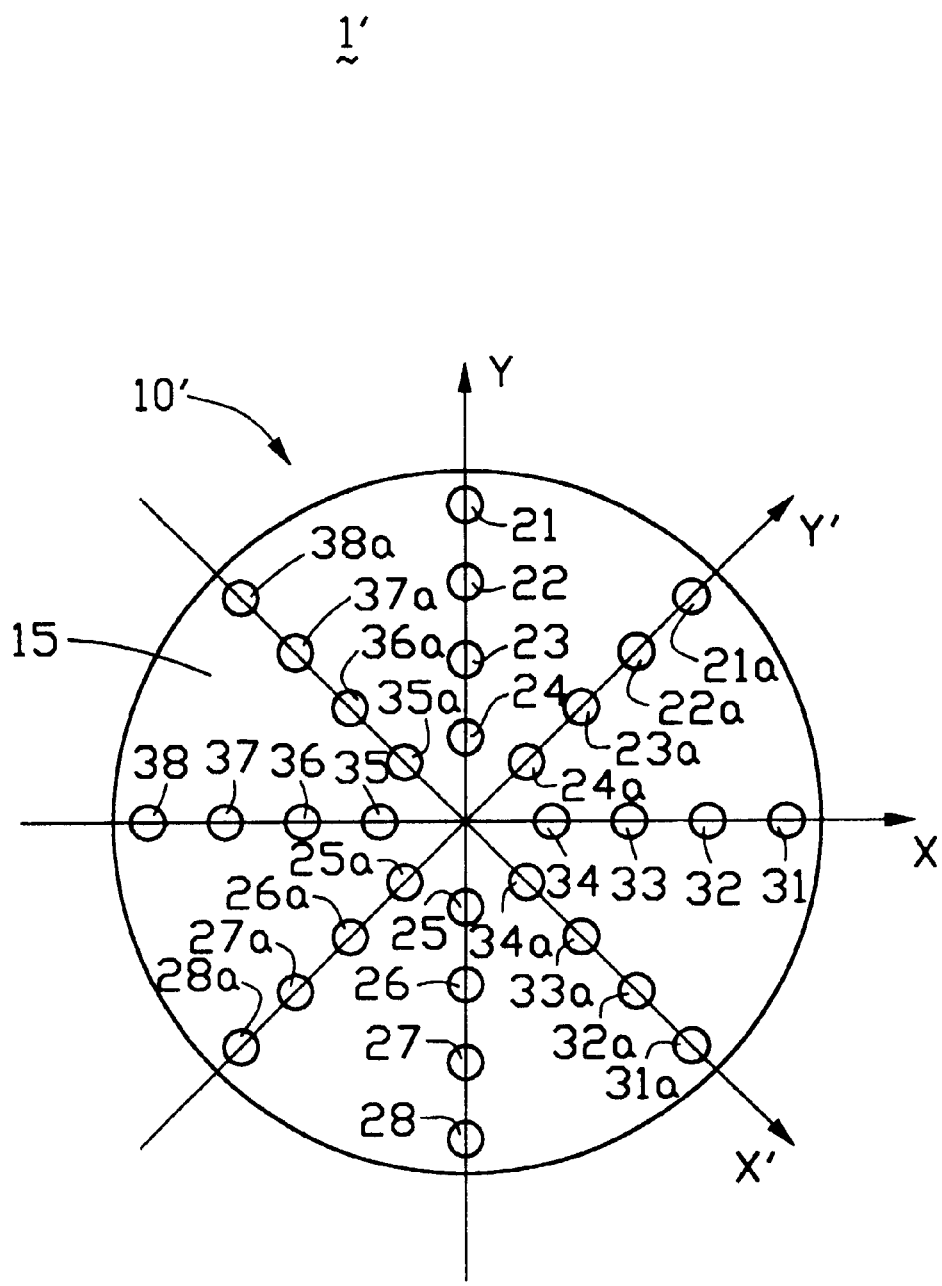
FIG. 5 is an elevational view of a light transmitting/ receiving sub-assembly in accordance with another embodiment of the present invention.
Figure 6:
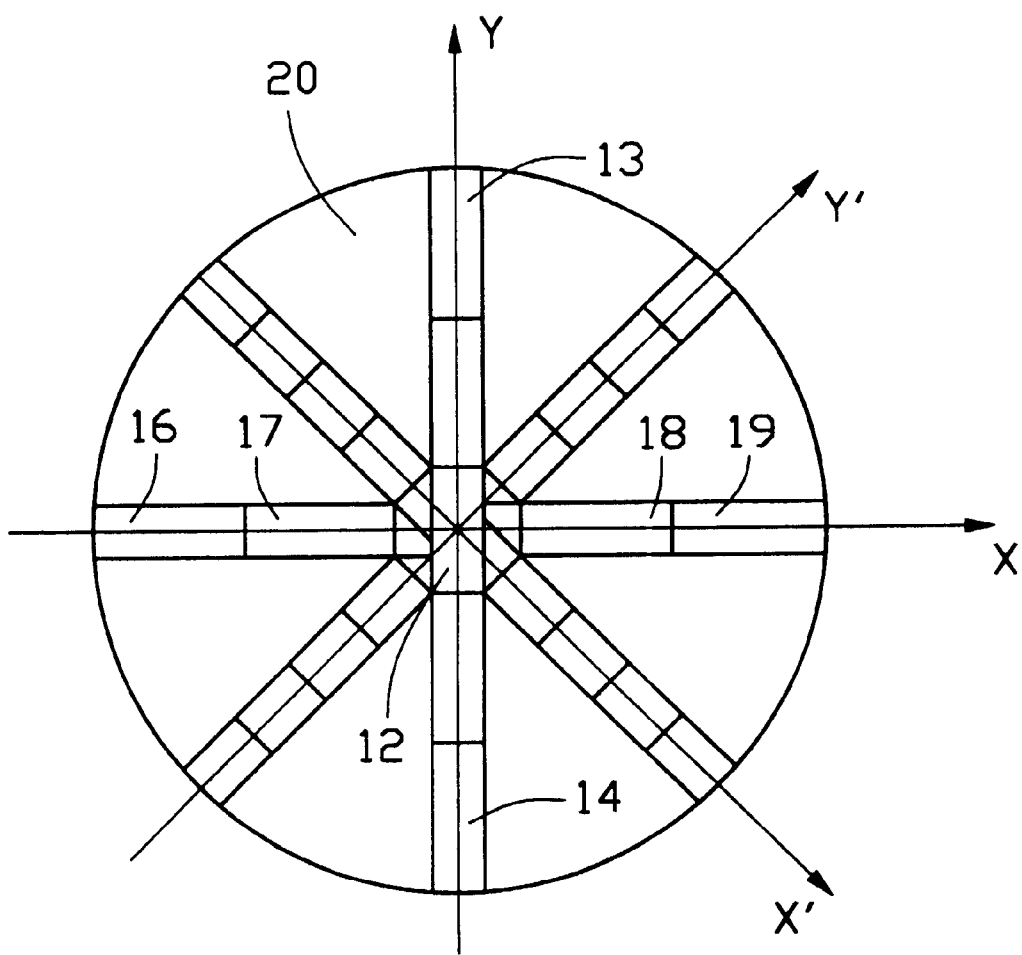
FIG. 6 is an elevational view of a reflecting means in accordance with another embodiment of the present invention.
Figure 7:
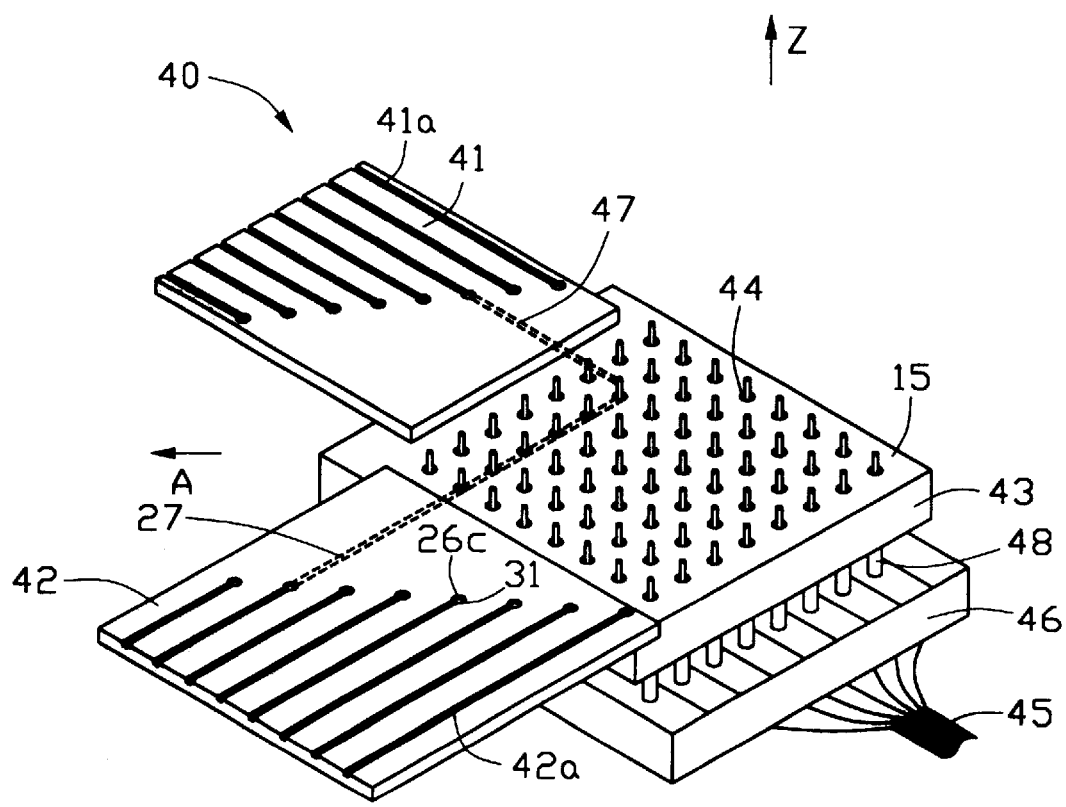
FIG. 7 is a perspective view of a conventional optical switch.
Figure 8:
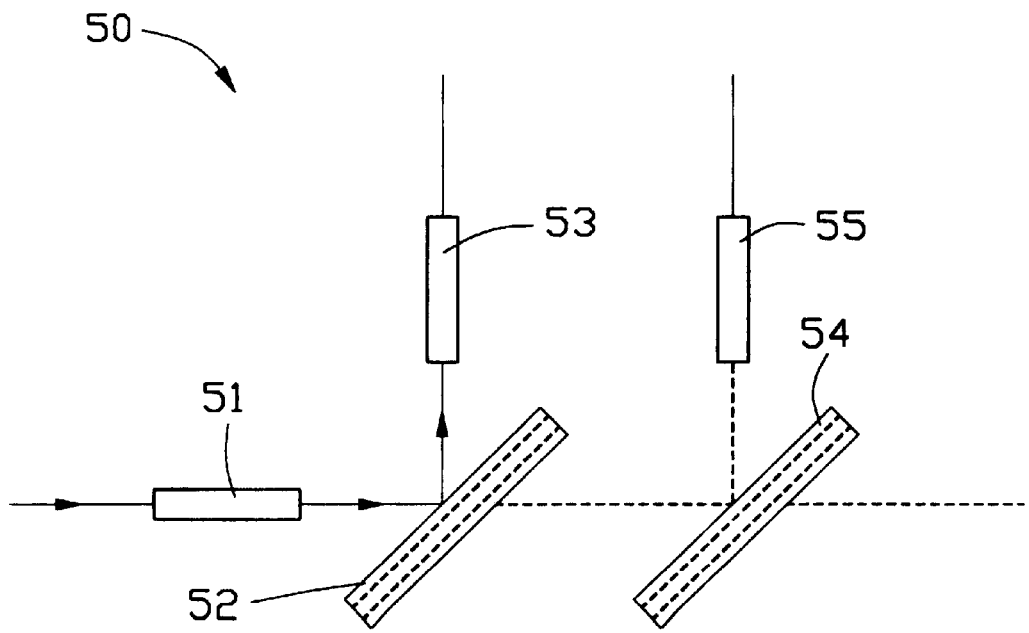
FIG. 8 is an elevation view of another conventional optical switch.

FIGS. 5 and 6 show another embodiment of an optical switch in accordance with the present invention which is designated with reference 1' for distinction. The optical switch 1' comprises a light transmitting/receiving subassembly 10' forming four linear arrays of equally-spaced collimators 21–28, 21a–28a, 31–38, 31a–38a. The four linear arrays are angularly equally spaced. That is they are spaced 45 degrees and extending along intersected axes Y, Y', X and X'. A reflecting means 12' comprises four reflecting strips arranged corresponding to the collimator arrays. The reflecting strips in the Y and X axes have two 90-degree angled mirrors and the reflecting strips in the Y' and X' axes have four 90-degree angled mirrors. The reflecting means 12' or the light transmitting/receiving subassembly 10' of the optical switch 1' only need to be rotated 45 degrees to perform the switching function. Other details of the switch 1' is similar to the switch 1 and is thus omitted.

The arrangements of the reflecting strips of the reflecting means 12 or 12' may vary by changing the amount of the angled mirrors of each reflecting strip or by changing the types of the angled mirrors of the reflecting strips. The spacing distance between the collimators of the subassembly 10 or 10', the free zone and the central blank area may be determined according to each individual optical switch incorporating with the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, a third type reflecting strip may be provided which forms only one pair of relatively bigger reflecting surfaces to respond to all eight collimators 21–28(31–38), and thus the reflecting paths thereof would be like collimator 21(31) to collimator 28(38), collimator 23(33) to collimator 26(36), collimator 25(35) to collimator 24(34), and collimator 27(37) to collimator 22(32). This pattern theoretically can be applied to the $2^n$ collimators arranged in one line wherein $n \geq 2$. Expectedly, by altering the positions/angles of the reflection surfaces, the input collimator for the incoming light and the output collimator for the reflecting light may no longer require to be symmetrically positioned by two sides of the rotation center or be parallel with one another in other a little bit complicate alterations.

What is claimed is:

1. An optical switch comprising:
    a light transmitting/receiving sub-assembly; and
    a reflecting means being confronted with the light transmitting/receiving sub-assembly for reflecting light signals from the transmitting/receiving sub-assembly to the transmitting/receiving subassembly; wherein
        the light transmitting/receiving sub-assembly and the reflecting means are rotatable relative to each other.

2. The optical switch as claimed in claim 1, wherein the reflecting means is driven to rotate relative to the sub-assembly by a driving post.

3. The optical switch as claimed in claim 2, wherein the reflecting means includes two reflecting strips perpendicular to each other.

4. The optical switch as claimed in claim 3, wherein one of the reflecting strips comprise two 90-degree angled mirrors.

5. The optical switch as claimed in claim 4, wherein the two 90-degree angled mirrors are arranged to be symmetrical about the driving post.

6. The optical switch as claimed in claim 3, wherein a free zone is formed around the central driving post at the intersection of the two reflecting strips.

7. The optical switch as claimed in claim 6, wherein the sub-assembly has a blank area corresponding to the free zone of the reflecting means.

8. The optical switch as claimed in claim 3, wherein the two reflecting strips are integratively formed on a disk.

9. The optical switch as claimed in claim 3, wherein the two reflecting strips are separative and are connected with each other by the central driving post.

10. The optical switch as claimed in claim 3, wherein one of the reflecting strips comprises four 90-degree angled mirrors which are arranged to be symmetrical about the driving post.

11. The optical switch as claimed in claim 1, wherein the sub-assembly comprises at least two arrays of light transmitting/receiving members.

12. The optical switch as claimed in claim 11, wherein the two arrays of light transmitting/receiving members comprise collimators.

13. The optical switch as claimed in claim 12, wherein the collimators of each array are equally spaced.

14. The optical switch as claimed in claim 1, wherein the sub-assembly is driven to rotate relative to the reflecting means by a driving post.

15. An optical switch comprising:
    a light transmitting/receiving sub-assembly including at least two light transmitting/receiving arrays symmetrical to a center thereof and crossing each other and having equal angles therebetween; and
    a reflecting means including at least two reflecting strips corresponding to the crossed light transmitting/receiving arrays for reflecting light signals therefrom and thereto, each reflecting strip having at least one angled reflecting member; wherein
        the light transmitting/receiving sub-assembly and the reflecting means confront each other and are rotatable with respect to each others whereby the arrays are selectively positioned opposite to the reflecting strips.

16. The optical switch as claimed in claim 15, wherein the reflecting strips comprise first and second reflecting strips perpendicular to each other.

17. The optical switch as claimed in claim 16, wherein the first reflecting strip has two angled reflecting members and the second reflecting strip has four angled reflecting members, both of the first and second reflecting strips being arranged symmetrically.

18. The optical switch as claimed in claim 17, wherein a central blank area is formed on the center of the light transmitting/receiving sub-assembly.

19. The optical switch as claimed in claim 18, wherein a free zone is formed on the reflecting means corresponding to the central blank area of the light transmitting/receiving sub-assembly.

20. The optical switch as claimed in claim 17, wherein the angled reflecting members are 90-degree angled mirrors.

21. The optical switch as claimed in claim 15, wherein the light transmitting/receiving arrays comprise first and second linear arrays of collimators.

22. The optical switch as claimed in claim 21, wherein the first and second collimator arrays are perpendicular to each other.

23. The optical switch as claimed in claim 15, wherein the light transmitting/receiving sub-assembly includes four light transmitting/receiving arrays all crossing at the center thereof and having a 45 degree angle between each other.

24. An optical switch comprising:
    a light transmitting/receiving sub-assembly; and
    a reflecting means face to face positioned close to the light transmitting/receiving sub-assembly for reflecting light signals therefrom and thereto; wherein
        a plurality of collimators are arranged in said light transmitting/receiving sub-assembly in a parallel relationship with one another.

25. The optical switch as claimed in claim 24, wherein said reflecting means includes a plurality of different groups of reflecting strips, and is moveable relative to the light transmitting/receiving sub-assembly to have different groups of the reflecting strips aligned with said collimators for switching input-output paths thereof.

26. The optical switch as claimed in claim 25, wherein each group of the reflecting strip includes at least one pair of reflecting surfaces each with a 90-degree included angle therebetween.

27. The optical switch as claimed in claim 25, wherein said reflecting means is rotatably moveable with regard to the light transmitting/receiving sub-assembly.

28. The optical switch as claimed in claim 24, wherein said collimators are arranged in one line.

29. The optical switch as claimed in claim 24, wherein a total number of said collimators is of $2^n$ and $n \geq 2$.

30. An optical switch comprising:

a light transmitting/receiving sub-assembly;

a plurality of collimators disposed in said light transmitting/receiving sub-assembly, some of said collimators being input collimators for incoming light and others being output collimators for reflecting light; and a reflecting means closely positioned opposite the light transmitting/receiving sub-assembly for reflecting light signals therefrom and thereto; wherein said reflecting means comprises different groups of reflecting strips each including at least one pair of reflecting surfaces generating twice reflection for each incoming light before said light enters the corresponding output collimator.

31. The optical switch as claimed in claim 30, wherein a total number of said collimators is of $2^n$ and $n \geq 2$.

* * * * *